United States Patent
Newman et al.

(10) Patent No.: US 6,473,523 B1
(45) Date of Patent: Oct. 29, 2002

(54) PORTABLE TEXT CAPTURING METHOD AND DEVICE THEREFOR

(75) Inventors: William M. Newman, Cambridge (GB); Carl Bothner, Rochester, NY (US); Ben S. Wittner, Marblehead, MA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/304,659

(22) Filed: May 4, 1999

(30) Foreign Application Priority Data

May 6, 1998 (GB) .............................. 9809679

(51) Int. Cl.$^7$ ................................. G06K 9/34
(52) U.S. Cl. .................. 382/176; 382/171; 382/313; 348/333.12
(58) Field of Search ................ 382/170–171, 382/173, 175–177, 181, 186–187, 189, 190, 229, 289–292, 312–313, 284; 348/220–221, 231, 333.01, 333.02, 333.12, 219; 358/462, 473–474; 345/156, 157, 163

(56) References Cited

U.S. PATENT DOCUMENTS

| | | | | |
|---|---|---|---|---|
| 5,402,171 A | * | 3/1995 | Tagami et al. | 348/219 |
| 5,473,344 A | * | 12/1995 | Bacon et al. | 345/163 |
| 5,477,264 A | * | 12/1995 | Sarbadhikari et al. | 348/231 |
| 5,517,856 A | * | 5/1996 | Knowlton | 382/292 |
| 5,917,944 A | * | 6/1999 | Wakisaka et al. | 382/190 |
| 5,960,114 A | * | 9/1999 | Dauerer et al. | 382/229 |
| 6,178,270 B1 | * | 1/2001 | Taylor et al. | 382/284 |

OTHER PUBLICATIONS

Galatsanos, Nikolas P. et al. "Methods for Choosing the Regularization Parameter and Estimating the Noise Variance in Image Restoration and Their Relation," IEEE Transactions on Image Processing, vol. 1, No. 3, Jul. 1992, pp. 322–336.*

Lagendijk, Reginald L. et al. "Maximum Likelihood Image and Blur Identification: A Unifying Approach," Optical Engineering, vol. 29, No. 5, May 1990, pp. 422–435.*

"Ricoh Exhibits New Digital Camera with Highest Resolution and Lowest Price in Its Class," http://www.hyperzine.com/scripts/getpress3.cgi?1305, original posting Nov. 11, 1996.*

* cited by examiner

Primary Examiner—Leo Boudreau
Assistant Examiner—Ishrat Sherali

(57) ABSTRACT

A portable imaging device includes a user operable pointing device that operates together with interactive segmentation functions and an OCR application for capturing and converting digitally recorded images to text. The user operable pointing device permits a user of the portable imaging device to identify a region in an image with textual content. The portable imaging device evaluates whether textual and formatting content in the segmented region can be properly analyzed by the OCR application. In addition, the portable imaging device provides a mode for translating text identified in recorded images.

20 Claims, 16 Drawing Sheets

FIG. 4
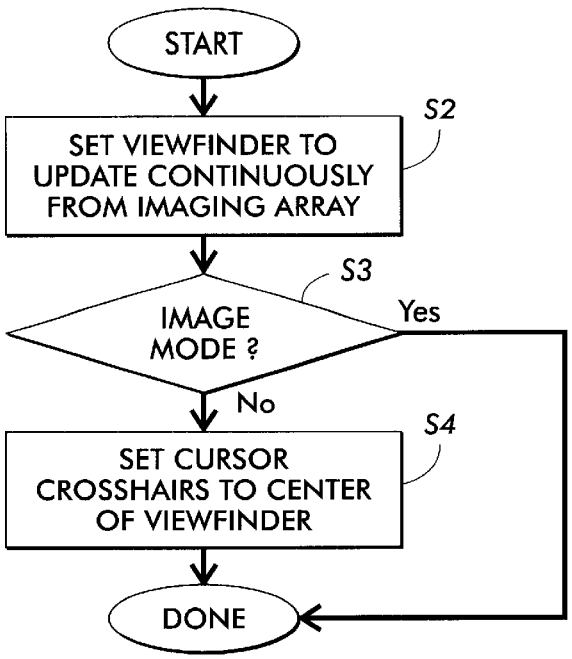
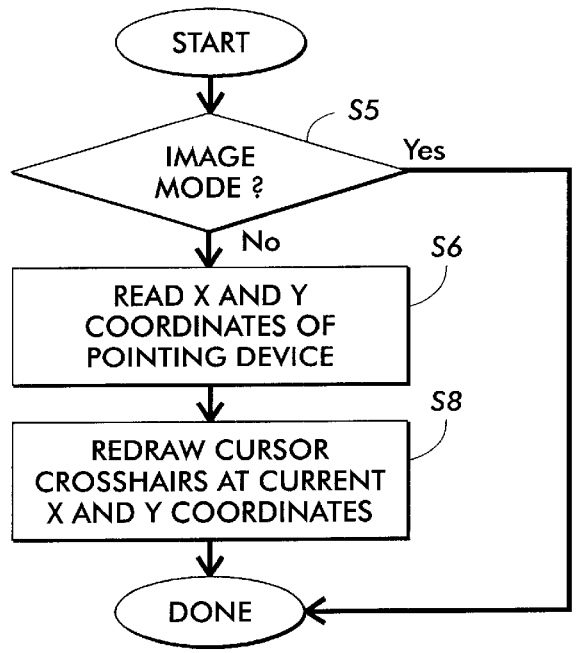
FIG. 5

FIG. 15
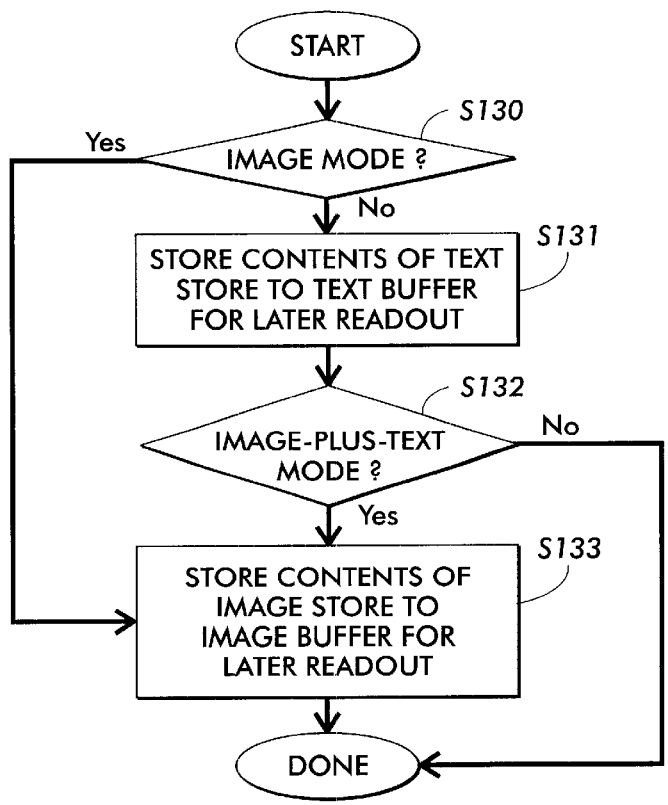
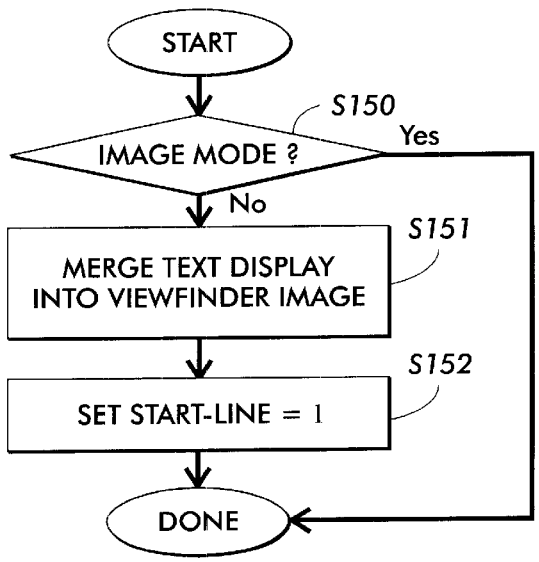
FIG. 16

Since there are many
evaluation aspects
for extraction
techniques and there

4

FIG. 19
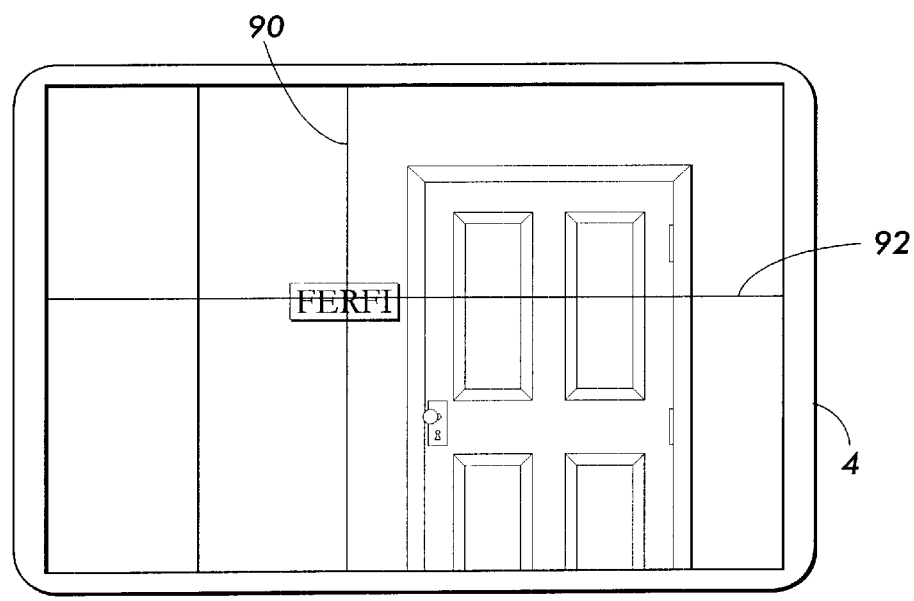
FIG. 20

PORTABLE TEXT CAPTURING METHOD AND DEVICE THEREFOR

BACKGROUND OF THE INVENTION

1. Field of the Invention

The present invention relates generally to a digital camera, and more particularly, to a system integral with the digital camera for identifying, translating, and recording text in images.

2. Description of Related Art

It is well known to use scanners, such as flatbed scanners, to capture and convert bitmap images of documents to text or structured documents. In some implementations of document scanners, the portion of the bitmap image that contains text is selected during a pre-scan pass of the document. The selected portion of the bitmap image is then re-scanned at a higher resolution and post-processed. The post-processing of the selected portion of the higher resolution image involves the application of selected image processing functions to clean and identify textual and formatting content of the scanned document. An example of a post-processing application is TextBridge® (sold by ScanSoft, Inc.), which is capable of converting scanned images into simple ASCII text documents or formatted documents with tables and pictures.

Performing a pre-scan pass and then rescanning an image to record document content with a handheld imaging device such as a digital camera, however, is not practical. A problem encountered when using digital image cameras to record textual content, in for example documents, is that digital image cameras generally do not have a high enough resolution to guarantee that the textual and formatting content in the recorded bitmap image will be properly detected by a post-processing application. Some digital cameras attempt to solve this problem by including a text-mode feature that is adapted to sharpen text features in a recorded image. Examples of digital cameras with a text-mode feature are the Power Shot 600 digital camera by Canon and the RDC-2E digital camera by Ricoh.

However, even with the text-mode feature, the recorded images may not be of sufficient resolution for post-processing applications such as TextBridge® to identify textual and other formatting content in a recorded image. Consequently, it is not until an image has been recorded using a digital camera and downloaded to a post-processing device such as computer that it is known whether the recorded image can be properly analyzed to identify textual and formatting content in the image. In addition, because there is no manner in which to identify the portion of the bitmap image that is of interest for post-processing analysis at the time it is recorded with a digital camera, the identifying information must be remembered and input at the time the image is post-processed.

Accordingly, it would be advantageous to provide a digital imaging device that overcomes these and other problems of recording digital images that consist of textual and formatting content. In particular, it would be advantageous to provide a digital camera that alerts a user when it is not likely that the digital camera is capable of recording an image with sufficient resolution to evaluate the recorded image for textual and formatting content. It would also be advantageous if such an improved digital camera provided a user with the ability to identify and preview those regions of the recorded image that contain textual data. It would be further advantageous if such a digital camera provided translation of detected textual data from one language to another.

SUMMARY OF THE INVENTION

In accordance with the present invention, there is provided a method and a portable imaging device therefor for capturing text. Initially, an image recorded with an imaging unit is displayed on a viewfinder of the portable imaging device. A first user input is received from a shutter release button. The first user input is adjusted using a pointing device for identifying a first position within the displayed image on the viewfinder. In response to the first user input, the image displayed on the viewfinder is recorded in a memory of the portable imaging unit. In addition, a second user input is received from the shutter release button. The second user input is also adjusted using the pointing device for identifying a second position within the displayed image on the viewfinder. Finally, an image segment is extracted from the image stored in the memory using the first position and the second position and examined to identify textual content.

In accordance with one aspect of the invention, an error rate for the textual content identified in the image segment is determined. A warning indicator is displayed on the viewfinder when the estimated error rate exceeds a threshold value. The purpose of the warning indicator is to alert the user of the portable imaging device when a recorded image cannot be accurately post-processed for the identification of textual or other formatting content. In accordance with another aspect of the invention, textual content is translated from one language to another. In one embodiment, the language from which to translate from is determined using a GPS system.

BRIEF DESCRIPTION OF THE DRAWINGS

These and other aspects of the invention will become apparent from the following description read in conjunction with the accompanying drawings wherein the same reference numerals have been applied to like parts and in which:

FIG. 4 shows the processing steps for implementing the INITIALIZE routine referenced in FIG. 3;

FIG. 5 shows the processing steps for implementing the REPOSITION routine referenced in FIG. 3;

FIG. 15 shows the processing steps for implementing the STORE routine referenced in FIG. 3;

FIG. 16 shows the processing steps for implementing the DISPLAY TEXT routine referenced in FIG. 3;

FIGS. 19 to 22 illustrate an example of an image displayed in the viewfinder while performing a single word selection routine in accordance with one embodiment of the invention.

DETAILED DESCRIPTION

Figure 1:
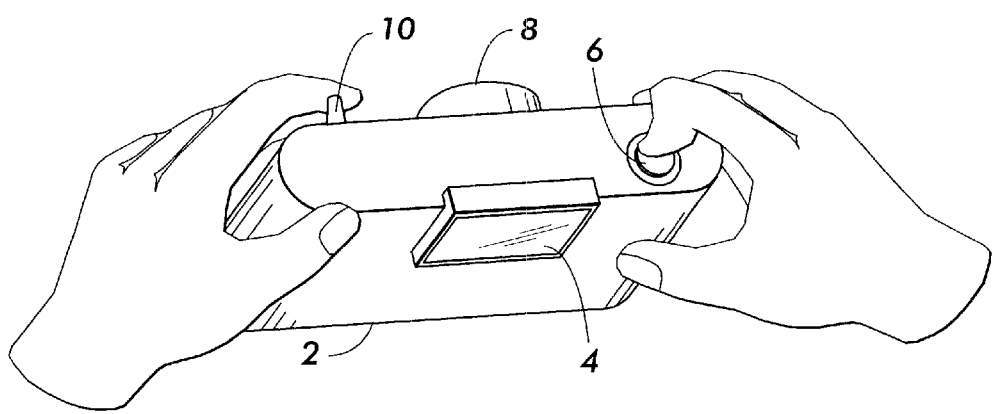
FIG. 1 illustrates a perspective view of a portable imaging device according to one embodiment of the invention.

FIG. 1 illustrates a perspective view of a portable imaging device 2 according to one embodiment of the invention. The portable imaging device 2 includes a viewfinder or display 4, a shutter release button 6, an imaging unit 8, and a pointing device 10. In the embodiment shown in FIG. 1, the viewfinder 4 is a flat panel display, such as a conventional LCD (Liquid Crystal Display) panel. The shutter release button 6 has two user-selectable positions (e.g., a half-press position and a full-press position) and operates in accordance with conventional camera technology. The imaging unit 8 includes a lens and an image array and digitization circuit. Part of the image array and digitization circuit is a two-dimensional CCD (Charged Coupled Device) array. In operation, images are focuses onto the two-dimensional CCD array by the lens and output from the CCD array for display on viewfinder 4.

In accordance with one aspect of the invention, a user identifies graphical features, such as text, captured by the imaging unit 8 and displayed on the viewfinder 4 with the pointing device 10. The pointing device 10 allows a user of the portable imaging device 2 to move cursor crosshairs (i.e., pointer) displayed on the viewfinder 4 (see, for example, U.S. patent Nos.: U.S. Pat. Nos. 5,489,900; 5,708,562; or 5,694,123). In the embodiment shown in FIG. 1, the pointing device 10 is a pointing stick, such as the TrackPoint® developed by IBM Corporation. In an alternate embodiment, the pointing device 10 is a touchpad or a trackball, or the combination of a pointing stick, a touchpad, or a trackball.

Figure 2:
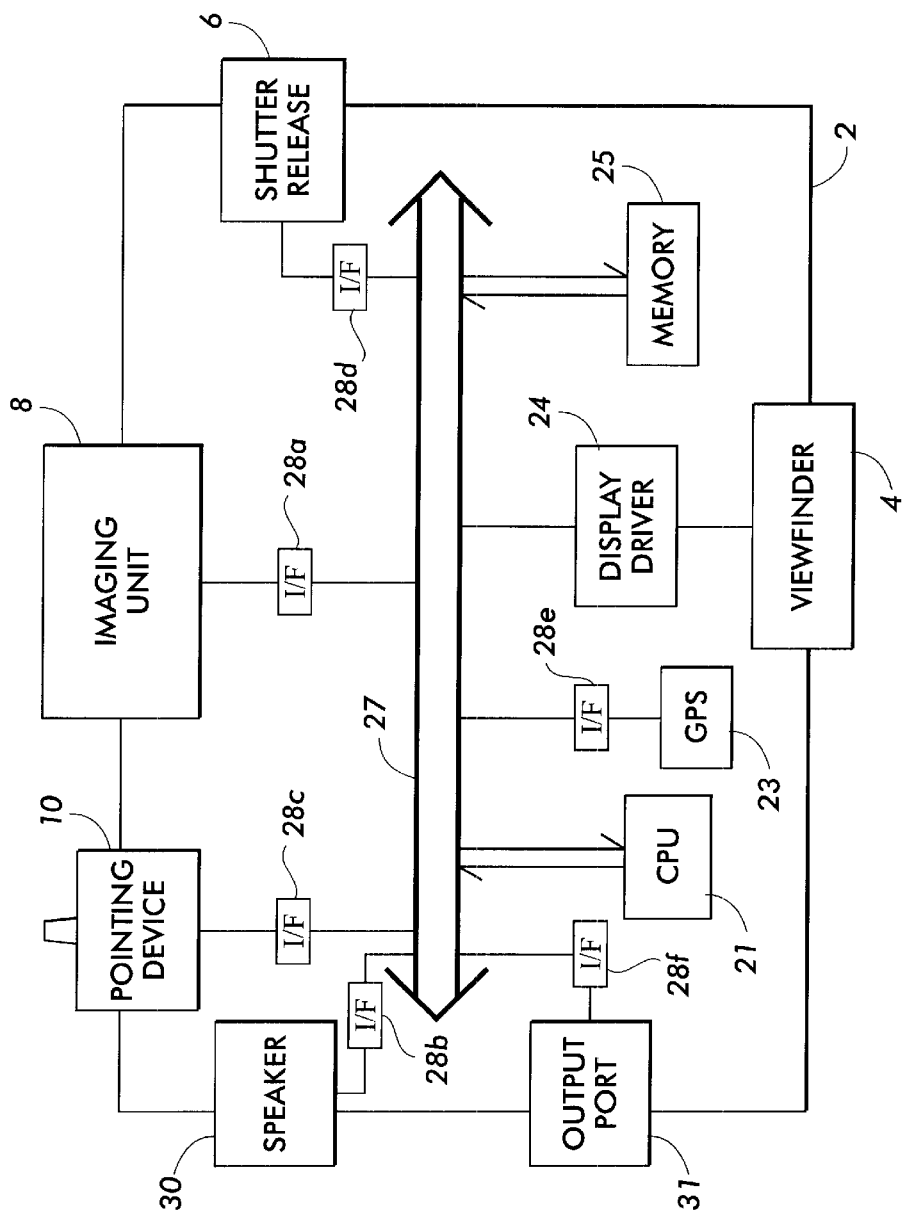
FIG. 2 is a schematic block diagram of the internal hardware of the device of FIG. 1.

FIG. 2 is a schematic block diagram of the internal hardware of the portable imaging device 2 illustrated in FIG. 1. In the embodiment shown in FIG. 2, a CPU (central processing unit) 21, a speaker 30, a GPS (Global Positioning System) 23, memory 25 (e.g., ROM and/or RAM), and output port 31 are coupled to a common bus 27. The image array and digitization circuit in the imaging unit 8 generate digital images and supply digital image data to bus 27 via interface (I/F) 28a. Digital images are output for display on the viewfinder 4 from bus 27 via display driver 24. The user operable devices (i.e., pointing device 10 and shutter release button 6) are also coupled to bus 27 for providing user inputs for processing by the CPU 21 via suitable interfaces 28c and 28d. In addition, CPU 21 is adapted to output image data, text data, and audio data recorded in memory 25 to output port 31 or speaker 30 via interfaces 28f and 28b, respectively.

Figure 3:
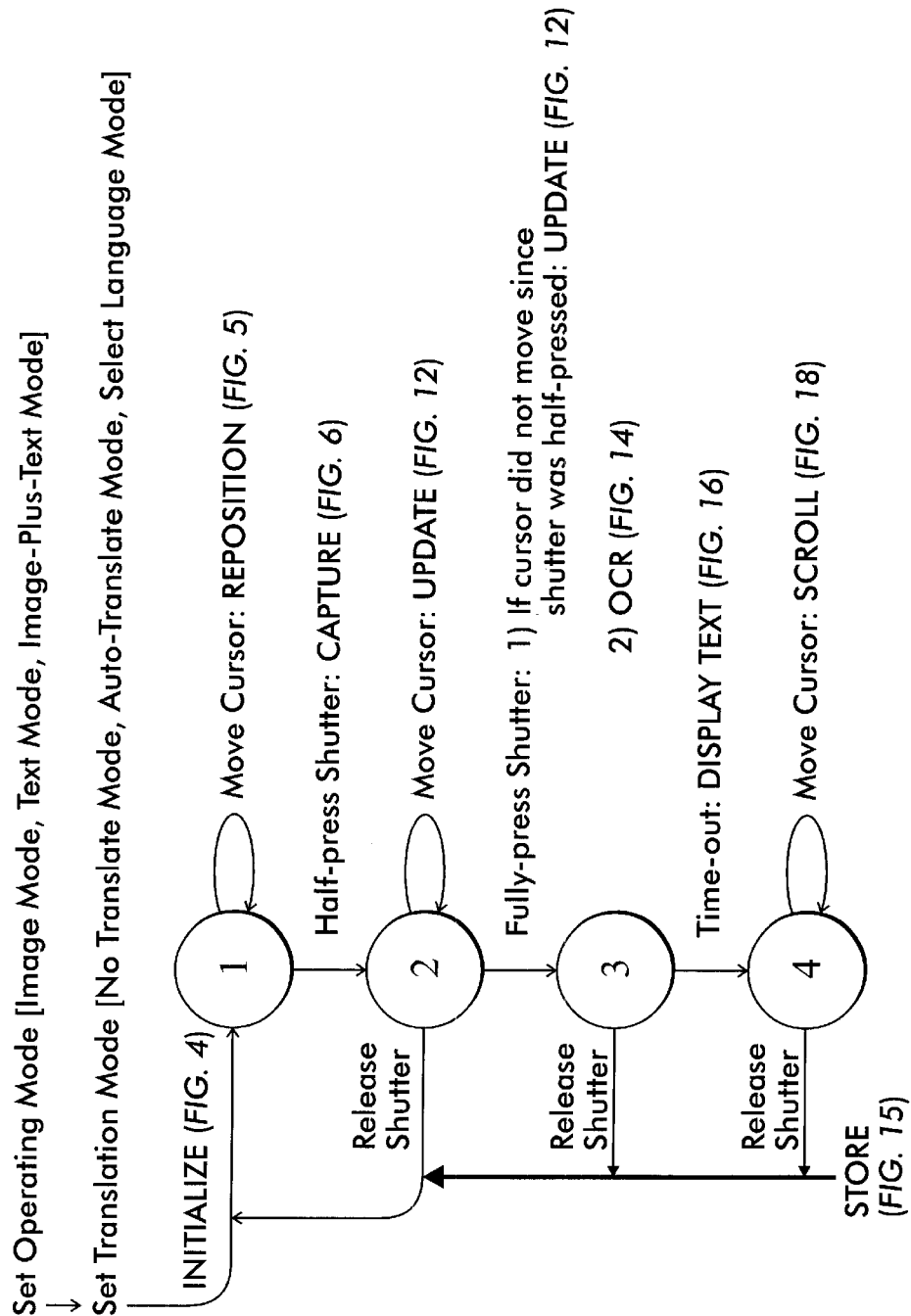
FIG. 3 schematically illustrates the sequence of steps for operating the portable imaging device shown in FIG. 1 in accordance with the present invention.

FIG. 3 schematically illustrates the sequence of steps for operating the portable imaging device 2 in accordance with the present invention. Initially the operating mode of the portable imaging device is set to one of an image mode, a text mode, or an image-plus-text mode. Subsequently, a translation mode is set to either a no-translate mode, an auto-translate mode, or a select-language mode. It will be appreciated by those skilled in the art that the portable imaging device 2 defaults to the no-translate mode when the operating mode is set to image mode. In one embodiment, stepping through a menu displayed on viewfinder 4 enables a user to set these modes of operation and translation. Alternatively, the portable imaging device could include individual operation and translation mode switches (not shown) for enabling a user to set these modes. When the portable imaging device is set to image mode, the pointing device 10 is disabled.

Generally, the sequence of operations set forth in FIG. 3 includes four state transitions (i.e., one (1), two (2), three (3), four (4)) and eight state transition routines (five between states: INITIALIZE, CAPTURE, OCR (Optical Character Recognition), STORE, and DISPLAY TEXT; and three within a state: REPOSITION, UPDATE, and SCROLL). As set forth below, the steps of the REPOSITION, UPDATE, OCR, DISPLAY TEXT, and SCROLL routines are not performed when the portable imaging device is set to image mode.

Figure 13:
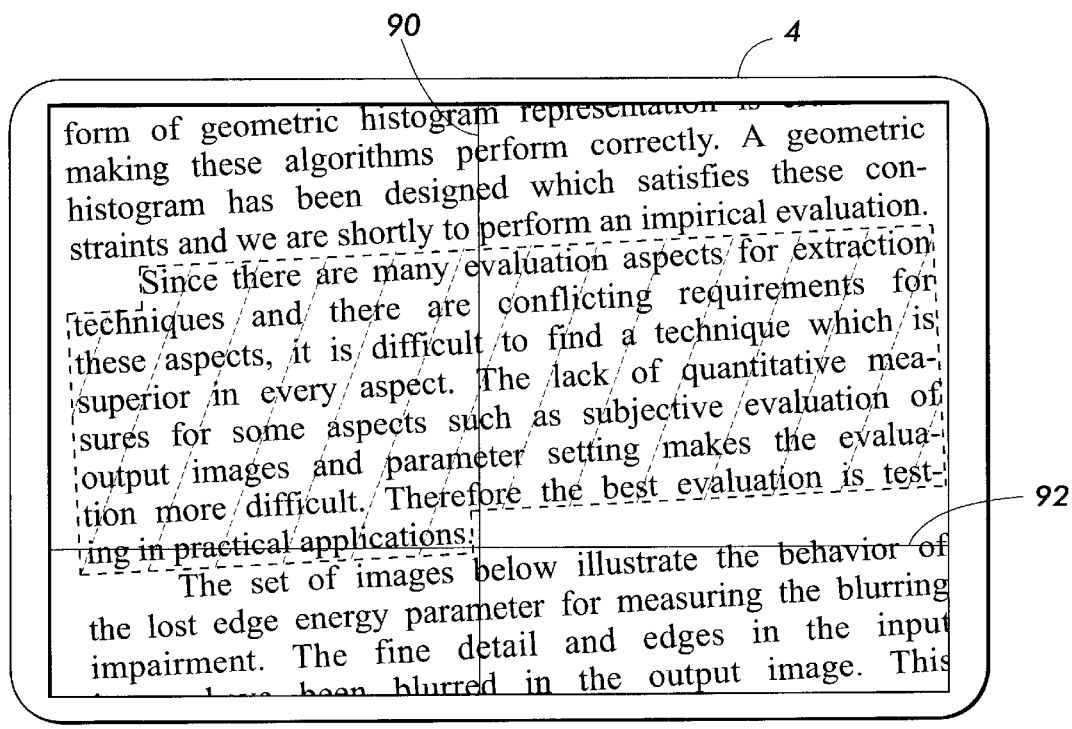
FIG. 13 shows an example of an image displayed in the viewfinder after performing the UPDATE routine set forth FIG. 12.

After setting the operating mode and the translation modes, an INITIALIZE routine is invoked to initialize the sequence of operations for performing image and/or text capture in accordance with the present invention. FIG. 4 shows the processing steps for performing the INITIALIZE routine referenced in FIG. 3. The INITIALIZE routine includes the step of setting (step s2) the viewfinder 4 to update continuously from the imaging array (e.g., live video). If the portable imaging device 2 is in image mode (step s3) the INITIALIZE routine terminates; otherwise, the cursor crosshairs are positioned at the center of the viewfinder 4 (step s4). In a preferred embodiment, the position of the cursor crosshairs, which is controlled with the pointing device 10, is indicated to the user in the viewfinder 4 by the intersection of two lines. FIG. 13 illustrates an example of a pair of crosshairs 90 and 92 displayed on viewfinder 4. One cross-hair 90 is vertical and extends the entire depth of the viewfinder 4; the other cross-hair 92 is horizontal and extends the entire width of the viewfinder 4. It will be appreciated that in alternate embodiments the cursor crosshairs can be implemented using any number different pointers known in the art for identifying objects displayed on the viewfinder 4.

As set forth in FIG. 3, any movement of the position of the cursor crosshairs on viewfinder 4 by the user with the pointing device 10 while in state one (1) and while the shutter is not depressed invokes a REPOSITION routine. FIG. 5 sets forth the processing steps for implementing the REPOSITION routine referenced in FIG. 3. Initially, if the portable imaging device 2 is in image mode (step s5), the routine terminates; otherwise (step s6), the X,Y coordinates that identify movement of the cursor cross-hair position on the viewfinder 4 are recorded as current X,Y coordinates. Subsequently after performing step s6, the current X,Y coordinates defined by the user's movement of the pointing device 10 are used to redraw the cursor crosshairs (step s8) on the viewfinder 4.

Figure 6:
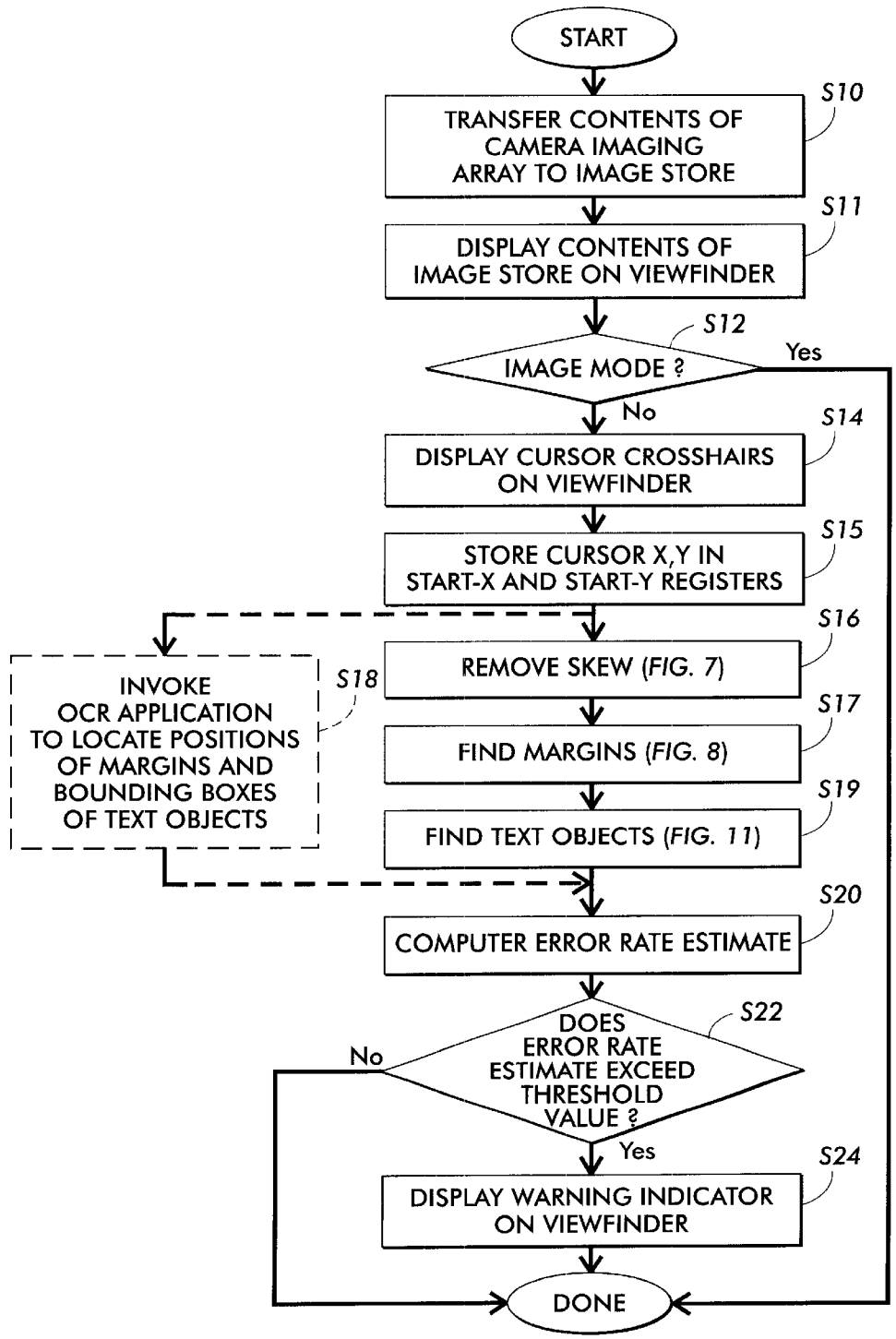
FIG. 6 shows the processing steps for implementing the CAPTURE routine referenced in FIG. 3.

Returning again to FIG. 3, when the user half-press the shutter release button 6 while in state one (1), a CAPTURE routine is invoked. FIG. 6 shows the processing steps for implementing the CAPTURE routine referenced in FIG. 3. Initially (step s10), the contents of the imaging array in the imaging unit 8 are transferred to a location identified as "image store" in the memory 25. Subsequently, the content of the image store are displayed on the viewfinder 4. Step s11, effectively freezes the image on the viewfinder 4 for further operations by the user. If the portable imaging device 2 is in image mode (step s12), the routine terminates; otherwise, the routine continues at step s14. At step s14, the cursor crosshairs are superimposed on the image displayed on the viewfinder 4 at the current X,Y coordinates. Next, the current cursor crosshairs X,Y coordinates are stored (step s15) in Start-X and Start-Y registers located in the memory 25. Because it is likely that the user has not been able to perfectly align the field of view of the device 2 with the text to be captured, skew is removed at step s16.

Figure 7:
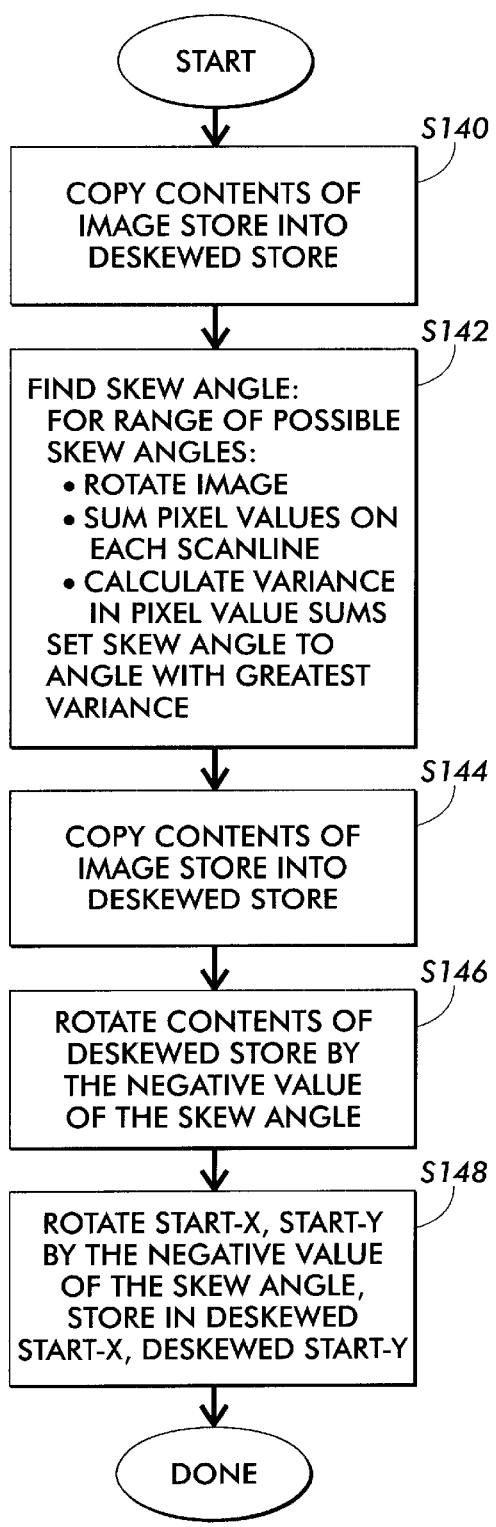
FIG. 7 shows the processing steps for implementing the REMOVE SKEW routine referenced in FIG. 6.

To remove any skew of the image stored in the image store at step s16, a skew angle of the field of view must be determined. Generally, a skew angle of the field of view may be determined and removed as described in U.S. Pat. No. 6,178,270, which is hereby incorporated by reference. More specifically, FIG. 7 shows the processing steps for implementing the REMOVE SKEW step s16 referenced in FIG. 6. Initially (step s140), the contents of image store in the memory 25 are copied into a location in memory 25 identified as "deskewed store". Then (step s142), for a range of possible skew angles (e.g., −5 to +5° in steps of 0.1°), and using the image stored in deskewed store, there are performed the steps of: rotating the image; summing the pixel values on each scanline; and calculating the variance in pixel value sums. A SkewAngle is then identified as the angle that gives rise to the greatest variance. The next step is for the contents of image store to be copied into deskewed store (step s144). Then, the contents of the deskewed store are rotated (step s146) by a negative value of SkewAngle, where SkewAngle is the angle determined at step s142. Finally, a rotation operation (step s148) by a negative value of SkewAngle is performed on coordinates Start-X and Start-Y, and the results stored in Deskewed-Start-X and Deskewed-Start-Y registers located in the memory 25 for further use.

Figure 8:
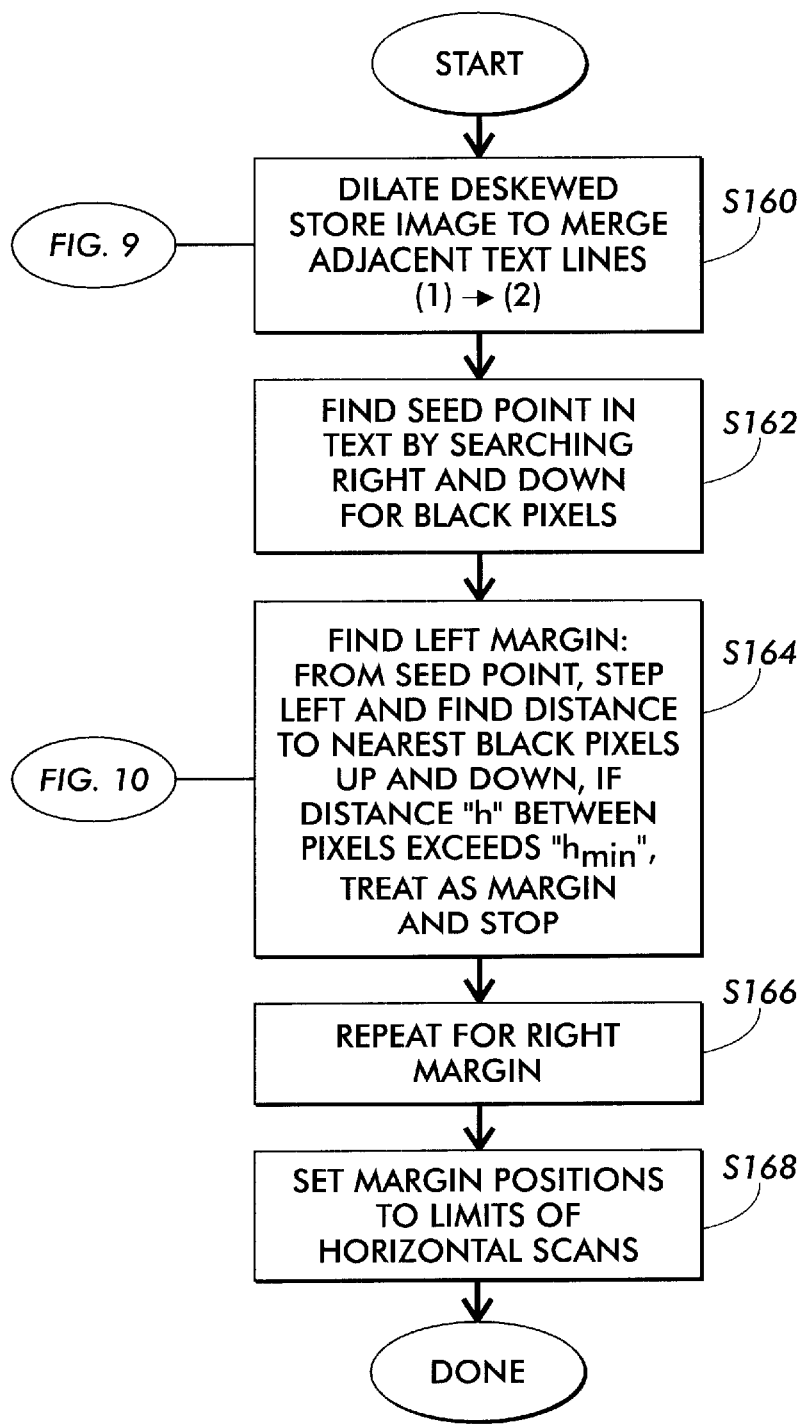
FIG. 8 shows the processing steps for implementing the FIND MARGINS routine referenced in FIG. 6.
Figure 9:
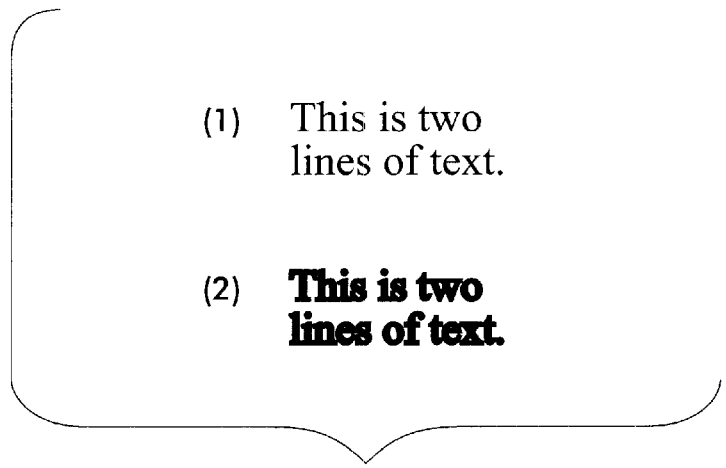
FIG. 9 illustrates an example of dilation of two lines of text in an image.
Figure 10:
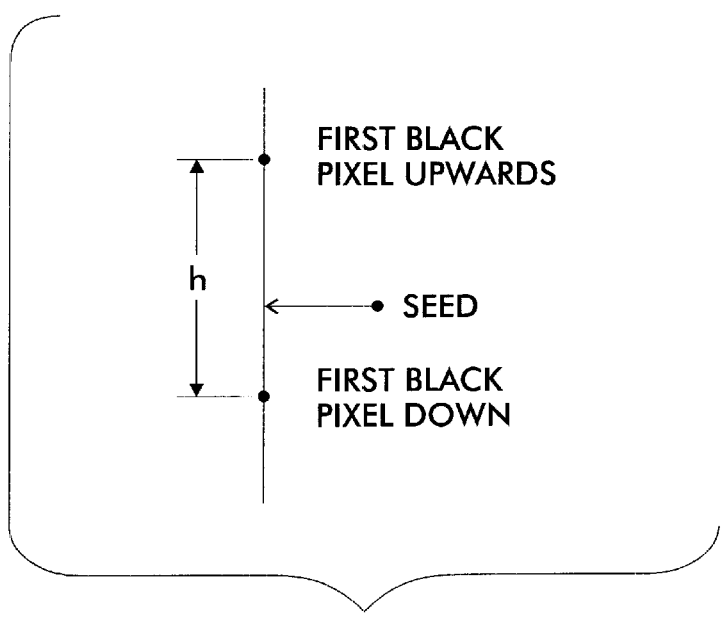
FIG. 10 illustrates an example of one manner of computing the distance between two points using a seed point.

Returning to FIG. 6, it will be seen that the REMOVE SKEW routine is followed by the FIND MARGINS routine (step s17). FIG. 8 shows the processing steps for implementing the FIND MARGINS routine referenced in FIG. 6. In the FIND MARGINS routine, the columns of white space to the left and to the right of the text are found. First, the image in deskewed store is dilated (step s160) in order to merge adjacent lines of text. An example of the dilation of two lines of text is illustrated in FIG. 9. Next, by searching right and down for black pixels a seed point in the text is found (step s162). Then, operations to find the left margin are performed (step s164): using the seed point obtained in step s162, a step is made to the left and the distance to the nearest black pixel up and down is determined. FIG. 10 illustrates an example of one manner of computing the distance between two points using a seed point. If the distance "h" between the pixels exceeds $h_{min}$, this is treated as a margin and the stepping halts; otherwise, a further step left is made. The next step (s166) is a repetition of the procedure in step s164, but for the right margin. The margin positions are then set (step s168) as the limits of a horizontal scan performed by FIND TEXT OBJECTS routine of step s19.

Figure 11:
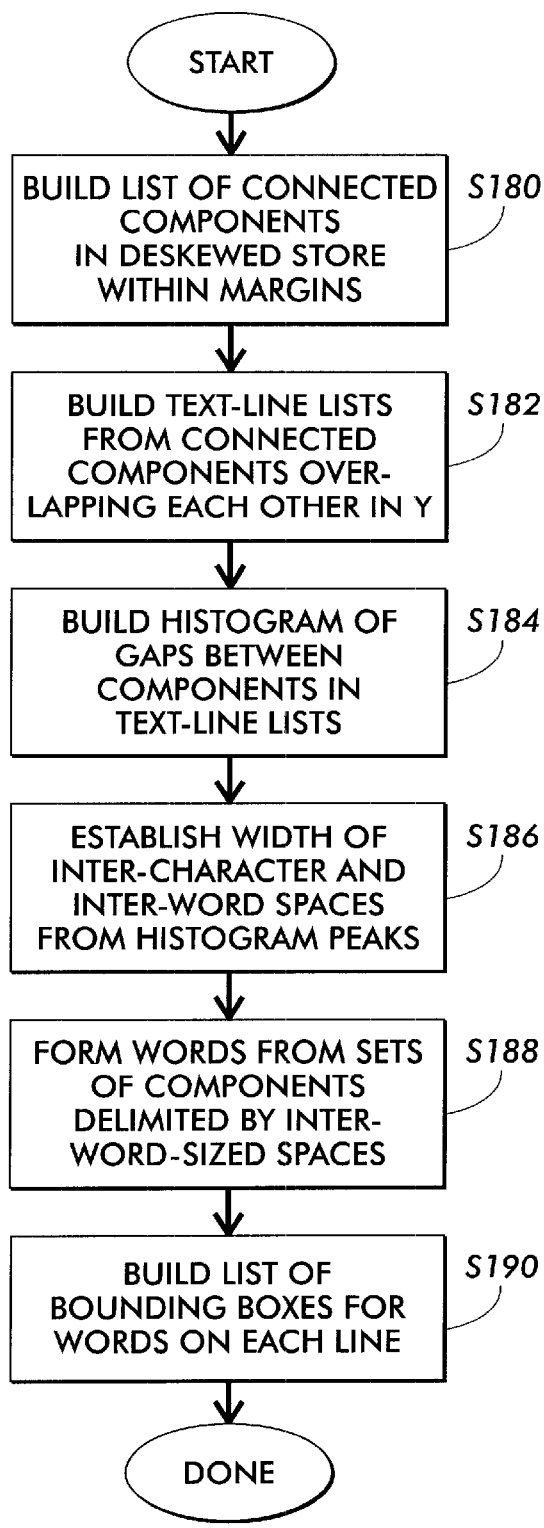
FIG. 11 shows the processing steps for implementing the FIND TEXT OBJECTS routine referenced in FIG. 6.

Returning to FIG. 6, it will be seen that the FIND MARGINS routine is followed by the FIND TEXT OBJECTS routine (step s19). FIG. 11 shows the processing steps for implementing the FIND TEXT OBJECTS routine of FIG. 6. In the FIND TEXT OBJECTS routine, bounding boxes for words and text-lines are found. The procedure commences (step s180) by building a list of connected components in deskewed store within the margins determined in step s17. Text-line lists are then built (step s182) from connected components overlapping each other in the Y direction; and a histogram of gaps between components in the text-line lists is then constructed (step s184). The next step is to derive (step S186) the width of inter-character and inter-word spaces from the histogram peaks, the details of which are set forth in U.S. Pat. No. 6,178,270. Then, words are formed from sets of components delimited by inter-word-sized spaces (step s188). From this, a list of bounding boxes for words on each line is built (step s190). In an alternate embodiment, step s18 is performed instead of steps s16, s17 and s19 in FIG. 6. At step s18, an OCR application such as TextBridge® is invoked to locate positions of margins and bounding boxes of text objects in the image stored in deskewed store.

Referring again to FIG. 6, after finding text objects at step s19, a determination is made as to whether it is likely that the image captured in image store has sufficient quality for an OCR application to accurately identify textual or formatting content therein. In accordance with this aspect of the invention, a user of the portable imaging device is warned before recording the image in image store by fully-pressing the shutter release button that it is likely that the OCR application will produce inaccurate results. This enables the user to perform corrective action (e.g., improving the light on the object being recorded) to improve the performance of the OCR application before recording the desired image. More specifically, an error rate estimate is computed (step s20) to determine whether to warn the user of potential OCR inaccuracies. The error rate estimate is computed by measuring the blur and/or noise in the text objects located at steps s18 or s19. The blur of an image can be measure using a technique as disclosed by Lagendijk et al., in "Maximum Likelihood Image and Blur Identification: A Unifying Approach," Optical Engineering, May 1990, pp. 422–435, which is incorporated herein by reference. The noise can be measured using a technique as disclosed by Galatsanos et al., in "Methods for Choosing the Regularization Parameter and Estimating the Noise Variance in Image Restoration and Their Relation," IEEE Trans. on Image Processing, Jul. 1992, pp. 322–336, which is incorporate herein by reference.

In addition, the error rate estimate can be supplemented by measuring the contrast and the text size of text objects located at step s19. The contrast of text objects can be measured from a histogram of windowed variance. A histogram of windowed variance can be generated by computing the variance of windows of pixels (e.g., between 7×7 and 20×20 pixels) in a captured image. Subsequently, a threshold value is computed from this histogram. The threshold value is chosen to discriminate between high and low variance. One method for determining a suitable threshold value between high and low variance is the Otsu thresholding method, which is disclosed by Trier et al., in "Goal-Directed Evaluation Of Binarization Methods," IEEE Transactions On Pattern Analysis and Machine Intelligence, Vol. 17, No. 12, pp. 1191–1201, 1995, which is incorporated herein by reference. Finally, the ratio of the mean variance of windows identified as having a high variance to the mean variance of the windows identified as having a low variance is computed. This ratio provides an approximate signal to noise ratio that can then be used as an estimate of image contrast.

Furthermore at step s19, an approximate value for text size can be found during de-skewing when there are several lines of text. For example, this can be done by computing the average distance, in pixels, between peaks in the pixel value sums (i.e., the sum of the pixel values on each scanline), to gain the line-to-line distance in pixels. Because of inter-line gaps, text size will typically be slightly less than this distance. It will be appreciated by those skilled in the art that there exist other methods for establishing what the value of "slightly less" should be. If the error rate estimate measured at step s20 exceeds a predetermined threshold value (step s22), then a warning indicator is displayed on viewfinder 4 (step s24). The warning indicator displayed on viewfinder 4 at step s24 is a text message, an error symbol, or a warning light. Alternatively, the warning indicator is an audible signal output through speaker 30.

Figure 12:
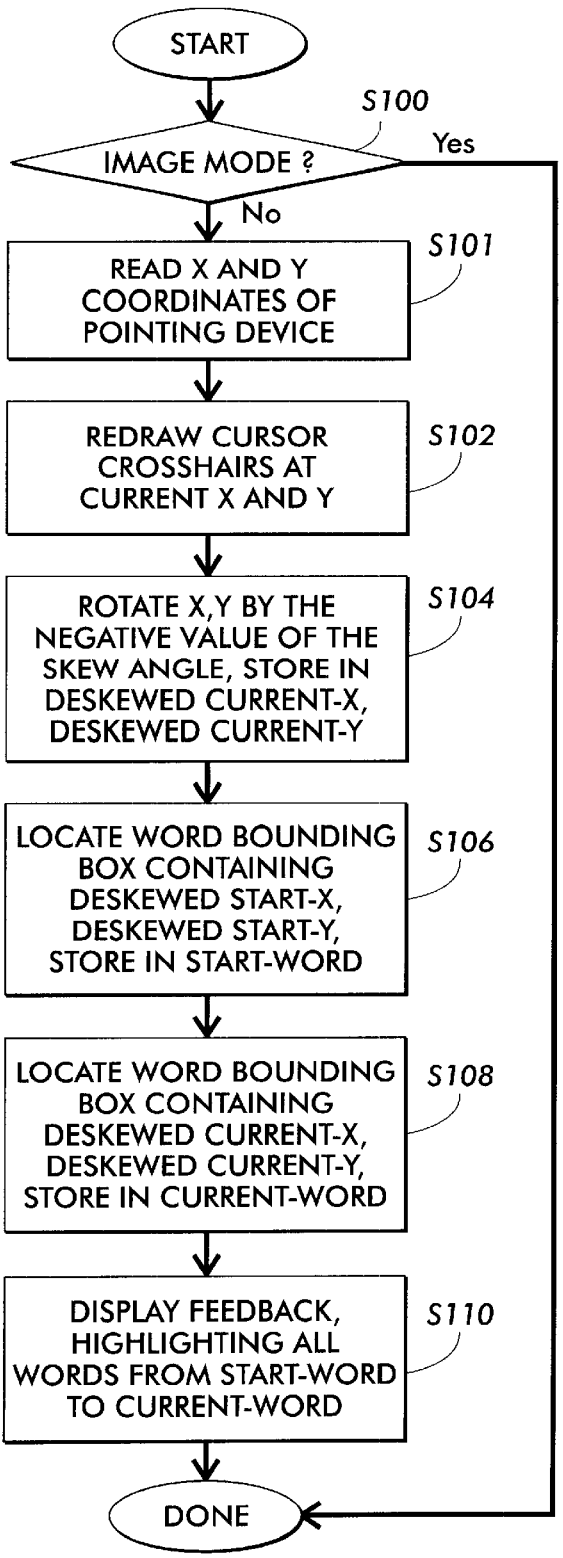
FIG. 12 shows the processing steps for implementing the UPDATE routine referenced in FIG. 3.

Returning to FIG. 3, it can be seen that once the CAPTURE routine is completed, state two (2) is reached. In state two (2), any movement of the cursor crosshairs position by the user using pointing device 10 invokes an UPDATE routine. FIG. 12 shows the processing steps for implementing the UPDATE routine referenced in FIG. 3. If the portable imaging device 2 is in image mode (s100), the routine terminates; otherwise, the routine continues at step s101. First, the X,Y coordinates (i.e., the current coordinates) of the pointing device 10 are read (step s101); and the cursor crosshairs are redrawn (step s102) at the current X,Y coordinates. Then, the current X,Y coordinates are rotated (step s104) by the negative value of SkewAngle, and the results stored in Deskewed-Current-X and Deskewed-Current-Y. Next, the word bounding box containing Deskewed-Start-X and Deskewed Start-Y are located and stored in Start-Word (step s106). This step is then repeated (step s108), but using Deskewed-Current-X and Deskewed-Current-Y, and the result stored in Current-Word. To display feedback to the user, images of the text are displayed (step s110) in which all words from Start-Word to Current-Word are highlighted (e.g., reversed out). FIG. 13 shows the image (containing highlighted text) displayed in the viewfinder after performing the UPDATE routine of FIG. 12.

Returning to FIG. 3, it will be seen that while the system is in state two (2), a shutter release operation by the user causes the re-initialization of the system, and a return to state one (1). In contrast, a full-press of the shutter release button 6 causes a state transition and the execution of the OCR routine on text selected by the user of the portable imaging device with the pointing device 10. However, before performing the steps of the OCR routine, which are set forth in detail in FIG. 14, a determination is made as to whether the cursor crosshairs position has moved since the shutter was half-pressed (i.e., while in state two (2)). If the cursor crosshairs position did not move while in state two (2), then the UPDATE routine set forth in FIG. 12 is invoked before invoking the OCR routine; otherwise, the OCR routine is immediately invoked.

Figure 14:
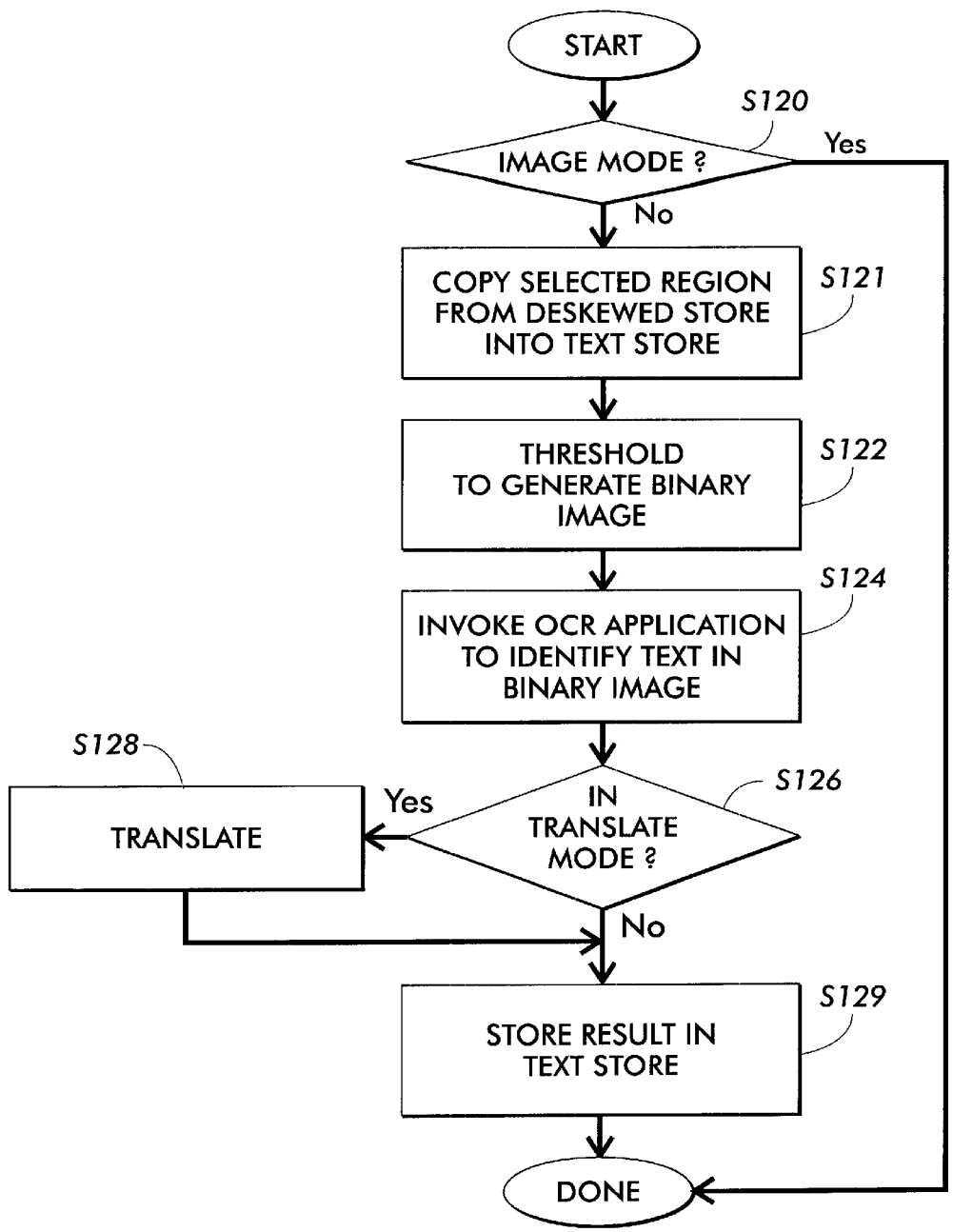
FIG. 14 shows the processing steps for implementing the OCR routine referenced in FIG. 3.

FIG. 14 shows the processing steps for implementing the OCR routine referenced in FIG. 3. If the portable imaging device 2 is in image mode (s120), the routine terminates; otherwise, it continues at step s121. Initially (step s121), the selected region (including the text matter the user wishes to convert) is copied from deskewed store into "text store" in the memory 25 for subsequent processing. Subsequently, the image in text store is thresholded (step s122) to generate a binary image, using techniques known in the art, as disclosed for example in U.S. Pat. No. 6,072,907, which is hereby incorporated by reference. As disclosed therein, such conversion may include resolution enhancement. The resulting binary image is then passed to an OCR application, such as TextBridge®, to convert the binary image to (ASCII) text for further use and/or manipulation (step s124). If in auto-translate mode or select-language mode (step s126), the text output from the OCR application is translated (step s128).

The text identified at step s124, whether translated at step s126 or not, is stored in text store (step s129). Referring again to FIG. 3, once the OCR routine completes the system transitions to state three (3).

As can be seen in FIG. 3, while the system is in states three (3) or four (4), a shutter release operation by the user causes a STORE routine to be invoked, followed by the re-initialization of the system, and a return to state one (1). FIG. 15 shows the processing steps for implementing the STORE routine of FIG. 3. First (step s130), if the portable imaging device 2 is in image mode the routine jumps to step s133; otherwise, step s131 is executed. At step s131, the OCRed (ASCII) text stored in text store is copied to a location of the memory 25 identified as "text buffer", for later readout (e.g., through uploading to the user's PC). Next (step s132), if the portable imaging device is set to image-plus-text mode, step s133 is performed; otherwise, the routine terminates. At step s133, the image contents of image store is copied to a location in the memory 25 identified as "image buffer" for later readout, for example, to the user's computer coupled to output port 31.

Figures 17, 18:
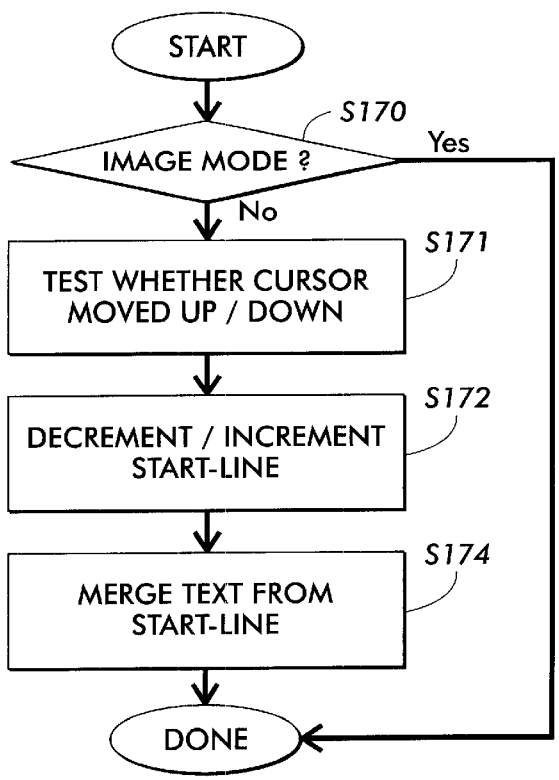
FIG. 17 shows the image displayed in the viewfinder with text overlaid on the original image after performing the DISPLAY TEXT routine in FIG. 16.
FIG. 18 shows the processing steps for implementing the SCROLL routine referenced in FIG. 3.

When the shutter release button 6 is held down for a time-out period in the full-press position by the user, while the system is in state three (3), a DISPLAY TEXT routine is invoked to display the OCRed results in the viewfinder, as set forth in FIG. 3. FIG. 16 shows the processing steps for implementing the DISPLAY TEXT routine referenced in FIG. 3. If the portable imaging device 2 is in image mode (s150), the routine terminates; otherwise, the routine continues at step s151. The text displayed, which corresponds to the content of the text store, is first merged (step s151) into the image displayed on the viewfinder 4. Then, the start-line is set (step s152) to one, in case of further operation such as scrolling though the image. FIG. 17 illustrates one manner in which to present the results in text store to the user on the viewfinder 4. As illustrated in FIG. 17, the results stored in the text store are overlaid on the original image stored in the image store.

Once the DISPLAY TEXT routine is completed, the system transitions to state four (4) as illustrated in FIG. 3. While in this state, the user, by moving the cursor cross-hair position via the pointing device 10, can scroll through the text displayed in the viewfinder 4. As set forth in FIG. 3 any movement of the cursor crosshairs position invokes the SCROLL routine. FIG. 18 shows the processing steps for implementing the SCROLL routine referenced in FIG. 3. If the portable imaging device 2 is in image mode (s170), the routine terminates; otherwise, step s171 is performed. Initially, a test is made (step s171) to determine whether the cursor crosshairs position has moved up or down from its prior position. If there is movement, the Start-line is incremented or decremented, accordingly (step s172). Using the new Start-line, the text is merged from the text store for display on the viewfinder 4 (step s174).

FIGS. 19 to 22 illustrate the images displayed in the viewfinder after executing a single word selection routine in accordance with one embodiment of the invention. In operation, the single word selection routine uses the pointing device 10 or shutter release button 6 to emulate a double mouse button click on a conventional computer (preceded if necessary by a suitable, i.e. Single-Word, mode selection by the user). Thus, with the cursor crosshairs centered in the display of viewfinder 4, a single word in a document, but more likely a distant object (seen at a distance in FIG. 19), may be selected and converted. For example, with the crosshairs coincident with the word ("FERFI", which is Hungarian for "MEN" in FIG. 20), the double click selects the word, and the shutter release being held down until a time out (e.g., a second or two), causes an image of the word to be captured and OCRed.

Figure 21:
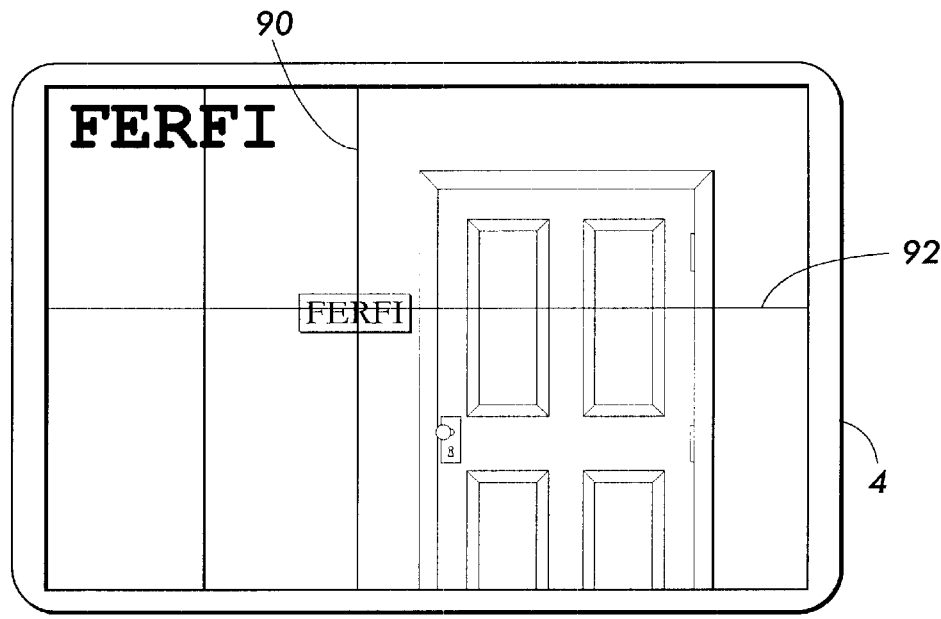
Figure 22:
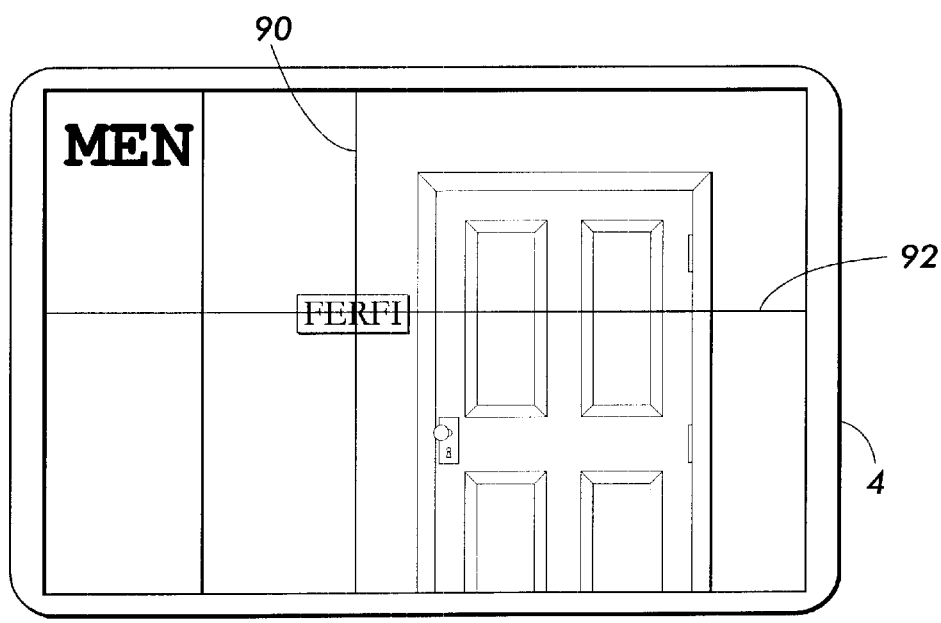

The resulting (ASCII) version of the word can then be used for subsequent processing. In one embodiment, the word after OCRing is displayed in the top left corner of the viewfinder 4, as shown in FIG. 21. In another embodiment, when the portable imaging device 2 is in translate mode, which is available when in text mode or image-plus-text mode, the portable imaging device 2 translates the word after OCRing into a desired language and displayed in the top left corner of the viewfinder 4, as illustrated in FIG. 22. When in select-language mode, the language to translate to is specified by the user on a menu displayed on viewfinder 4. In contrast, when in auto-translate mode, clues as to which language to translate from are provided by coordinates received from GPS 23 through interface 28e, or a language guesser as disclosed, for example, in "Comparing Two Language Identification Schemes," *Proceedings of the 3rd International Conference on the Statistical Analysis of Textual Data* (JADT'95), Rome, Italy, December 1995. The language from which to translate from can be either specified using a default value stored in memory 25 and/or specified by the user on a menu displayed on viewfinder 4.

In an alternate embodiment, an additional function can be added to aid blind or partially sighted people by synthesizing speech from OCRed text displayed in viewfinder 4. In this alternate embodiment, audio data stored in memory 25 representing the word identified after OCRing or translation into a desired language is output through speaker 30. In yet another alternate embodiment, this function is combined with a rangefinder to determine the distance of the recorded text from the user, and to generate speech that combines both pieces (i.e., text and distance) of information. For example, an object in an image captured at 50 feet and OCRed as "bus station" could be combined and output through speaker 30 as "50 feet from the bus station."

To recapitulate, the present invention involves integrating a finger-operated pointing device to a portable imaging device, which includes interactive segmentation (using the camera viewfinder for feedback) and OCR applications. The digital imaging device in which images containing textual and formatting constructs are captured by an imaging unit and displayed by a display device. The integrated user operable pointing device allows a user of the portable imaging device to determine whether textual and formatting content in the image can be properly analyzed by OCR applications.

In one embodiment, the portable imaging device is operated by performing the steps of: (a) displaying successive images captured by the imaging unit on the display device, each image being defined by grayscale and/or color data, (b) receiving a first user input defining the start of a selection and a first position within the displayed image, (c) in response to the first user input, freezing the displayed image, (d) receiving at least one further user input, including a final user input defining the end of a selection, (e) extracting from the frozen displayed image a selected image having extremities defined by the first and final user inputs, and (e performing an optical character recognition operation on data defining the selected image to generate text data, the text data defining text corresponding to text matter within the selected image.

The portable imaging device has the following advantages: 1) text is scanned, OCRed and visually checked on the spot, so that any problems with image quality are discovered at once rather than later when up-loading to a PC; 2) the pointing device allows just the required portion of the document image to be selected and stored, and interactive segmentation allows just the words or paragraphs of interest to be selected; 3) ability to store as text allows many more document pages to be stored locally before up-loading; 4) lengthy documents can be captured with the aid of a recirculating document feeder; and 5) text can be captured off physical objects, e.g., serial numbers of product labels, names off signs or conference badges.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for capturing text with a portable imaging device, comprising the steps of:

displaying an image recorded with an imaging unit on a viewfinder;

receiving a first user input from a shutter release button; the first user input being adjusted using a pointing device for identifying a first position within the displayed image on the viewfinder;

recording the displayed image in a memory of the portable imaging unit;

receiving a second user input from the shutter release button; the second user input being adjusted using the pointing device for identifying a second position within the displayed image on the viewfinder;

extracting an image segment from the image stored in the memory using the first position and the second position; and examining the image segment to identify textual content.

2. The method according to claim 1, further comprising the step of providing a notification on the viewfinder when said examining step fails to accurately identify textual content in the image segment.

3. The method according to claim 1, further comprising the step of superimposing the textual content identified in the image segment on the image displayed on the viewfinder.

4. The method according to claim 1, wherein said extracting step extracts an image segment that represents a word of text when the first position is substantially identical to the second position.

5. The method according to claim 1, wherein said extracting step extracts an image segment having boundaries defined by the first position and the second position when the first position and the second position identify substantially different positions on the viewfinder.

6. The method according to claim 1, further comprising the step of receiving a third user input from the shutter release button; the third user input causing the textual content identified by said examining step to be stored in the memory of the portable imaging device.

7. The method according to claim 1, further comprising the step of estimating an error rate for the textual content identified by said examining step.

8. The method according to claim 7, further comprising the step providing a warning indicator when the error rate estimated by said estimating step exceeds a threshold value.

9. The method according to claim 1, further comprising the step of translating the identified textual content from a first language to a second language.

10. The method according to claim 9, wherein the second language is selected using a global positioning system.

11. A portable imaging device, comprising:
- an imaging unit for outputting a digital representation of an image viewed through a lens;
- a viewfinder for displaying an image recorded with said imaging unit;
- a shutter release button for outputting a first user input and a second user input;
- a pointing device for adjusting the first user input and the second user input; the first user input identifying a first position within the image displayed on said viewfinder, and the second user input identifying a second position within the image displayed on said viewfinder;
- a memory for recording the image displayed on said viewfinder; and
- a processor for extracting an image segment from the image stored in the memory using the first position and the second position; said processor examining the extracted image segment to identify textual content therein.

12. The portable imaging device according to claim 11, wherein said viewfinder includes means for providing a notification when said processor fails to accurately identify textual content in the image segment.

13. The portable imaging device according to claim 11, wherein said processor superimposes textual content identified in the image segment on the image displayed on said viewfinder.

14. The portable imaging device according to claim 11, wherein said processor extracts an image segment that represents a word of text when the first position is substantially identical to the second position.

15. The portable imaging device according to claim 11, wherein said processor extracts an image segment having boundaries defined by the first position and the second position when the first position and the second position identify substantially different positions on said viewfinder.

16. The portable imaging device according to claim 11, wherein said shutter release button outputs a third user input for causing the textual content identified by said processor to be stored in said memory.

17. The portable imaging device according to claim 11, wherein said processor estimates an error rate for the textual content identified.

18. The portable imaging device according to claim 17, further comprising means for providing a warning indicator when the error rate estimated by said processor exceeds a threshold value.

19. The portable imaging device according to claim 11, wherein said processor translates identified textual content from a first language to a second language.

20. The portable imaging device according to claim 19, further comprising a global positioning system for selecting the second language.

* * * * *